United States Patent [19]

Shinzawa et al.

[11] Patent Number: 4,887,427
[45] Date of Patent: Dec. 19, 1989

[54] EXHAUST PARTICLE REMOVING SYSTEM FOR AN ENGINE

[75] Inventors: Motohiro Shinzawa; Nobukazu Kanesaki, both of Yokosuka, Japan

[73] Assignee: Nissan Motor Company, Limited, Japan

[21] Appl. No.: 227,034

[22] Filed: Sep. 2, 1988

Related U.S. Application Data

[63] Continuation of Ser. No. 925,152, Oct. 27, 1986, abandoned.

[30] Foreign Application Priority Data

Oct. 28, 1985 [JP] Japan .................... 60-239562

[51] Int. Cl.$^4$ ........................... F01N 3/02
[52] U.S. Cl. ........................ 60/286; 60/302; 60/311
[58] Field of Search ............ 60/274, 286, 295, 302, 60/311

[56] References Cited

U.S. PATENT DOCUMENTS

| | | | |
|---|---|---|---|
| 3,999,967 | 12/1976 | Aoi | 60/311 |
| 4,450,682 | 5/1984 | Sato | 60/286 |
| 4,451,441 | 5/1984 | Ernest | 60/311 |
| 4,462,208 | 7/1984 | Hicks | 60/286 |
| 4,485,621 | 12/1984 | Wong | 60/288 |
| 4,535,588 | 8/1985 | Sato | 60/286 |
| 4,663,934 | 5/1987 | Sickels | 60/302 |

FOREIGN PATENT DOCUMENTS

| | | | |
|---|---|---|---|
| 18016 | 2/1981 | Japan | 60/303 |
| 2000046 | 1/1979 | United Kingdom | 60/302 |

Primary Examiner—Douglas Hart
Attorney, Agent, or Firm—Lowe, Price, LeBlanc, Becker & Shur

[57] ABSTRACT

A first filter is disposed in an engine exhaust passage. A second filter is disposed in the engine exhaust passage at a location downstream of the first filter. Thus, the first and second filters are connected in series with one another. The first and second filters are designed so that an amount of exhaust particles trapped by the first filter is greater than an amount of exhaust particles trapped by the second filter. A pressure across the series combination of the filters may be detected. The filters may be rejuvenated when the detected pressure across the series combination of the filters reaches a reference pressure.

9 Claims, 6 Drawing Sheets

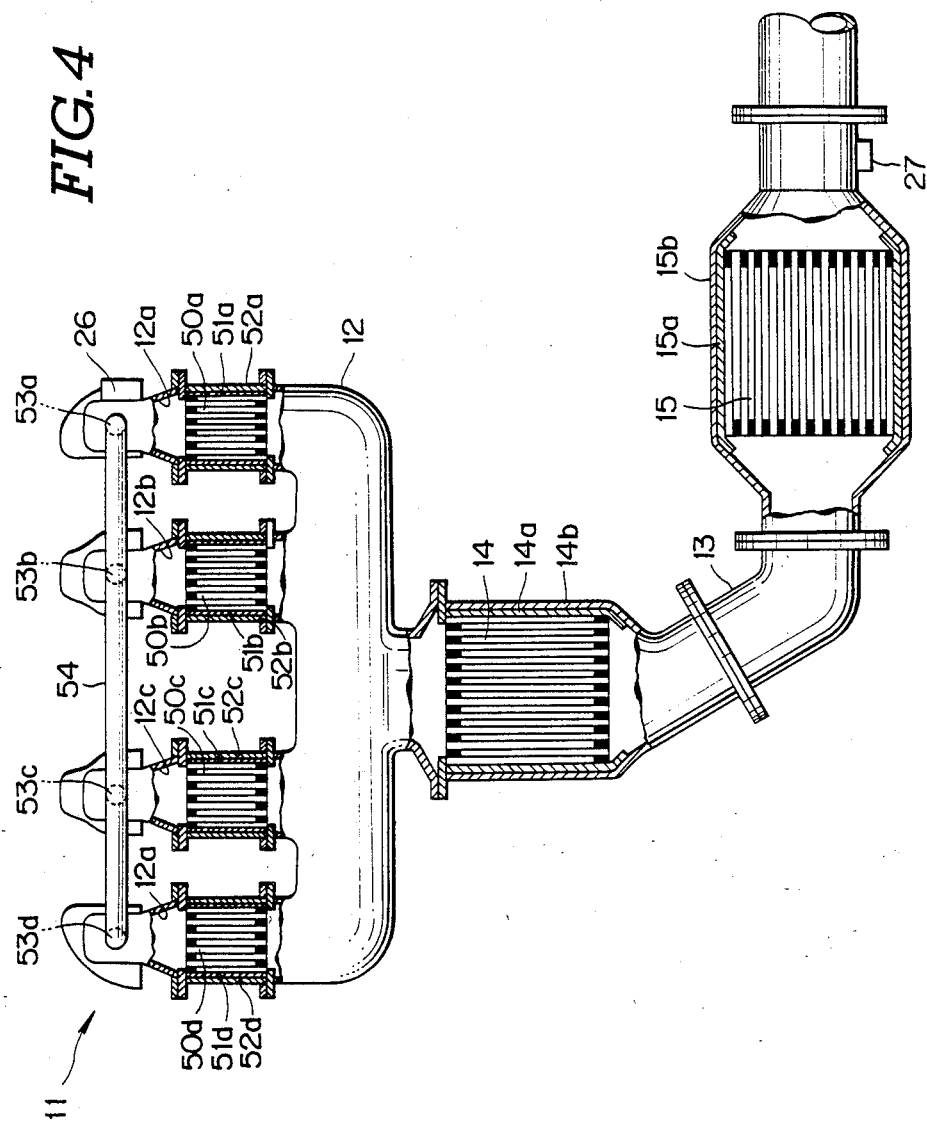

EXHAUST PARTICLE REMOVING SYSTEM FOR AN ENGINE

This is a continuation of application Ser. No. 925,152 filed Oct. 27, 1986, and now abandoned.

BACKGROUND OF THE INVENTION

1. Field of the Invention

This invention relates to a system for removing exhaust particles produced by an engine, such as a diesel engine.

2. Description of the Prior Art

The exhaust from diesel engines contains pollutive particles. A filter is conventionally used to remove pollutive particles from the engine exhaust. As the filter traps the particles, it clogs. A known way of rejuvenating a clogged filter is to increase the temperature of the engine exhaust above a certain level and thereby to burn off the particles from the filter.

Particular additive agents pre-mixed with engine fuel can lower the minimal exhaust temperature necessary for rejuvenating a clogged filter, since the additive agents included in the engine exhaust facilitate burning of the particles deposited on the filter.

Japanese patent publication No. 59-201916 discloses exhaust cleaning systems for diesel engines. These systems include an upstream filter and a downstream filter disposed in an engine exhaust passage. The upstream filter is designed to trap pollutive exhaust particles. When the upstream filter clogs, a burner is activated to increase the exhaust temperature to burn off the particles from the filter. An additive agent included in engine fuel lowers the minimal exhaust temperature necessary for rejuvenating the upstream filter. The additive agent generates pollutive ashes. The downstream filter is designed to trap these ashes. As the downstream filter traps the ashes, it clogs.

Accordingly, it is necessary to periodically replace the downstream filter.

SUMMARY OF THE INVENTION

It is an object of this invention to provide a maintenance-free exhaust particle removing system for an engine.

It is a second object of this invention to provide an efficient exhaust particle removing system for an engine.

It is a third object of this invention to provide an exhaust particle removing system for an engine which dispenses with additive agents.

According to an exhaust particle removing system of this invention, a first filter is disposed in an engine exhaust passage and a second filter is disposed in the engine exhaust passage at a location downstream of the first filter. Thus, the first and second filters are connected in series with one another. The first and second filters are designed so that an amount of exhaust particles trapped by the first filter is greater than an amount of exhaust particles trapped by the second filter. A pressure across the series combination of the filters may be detected. The filters may be rejuvenated when the detected pressure across the series combination of the filters reaches a reference pressure.

BRIEF DESCRIPTION OF THE DRAWINGS

FIG. 4 is a side view, partially in section, of an engine exhaust system including an exhaust particle removing system according to a second embodiment of this invention.

Like and corresponding elements are denoted by the same reference characters throughout the drawings.

DESCRIPTION OF THE FIRST PREFERRED EMBODIMENT

Figure 1:
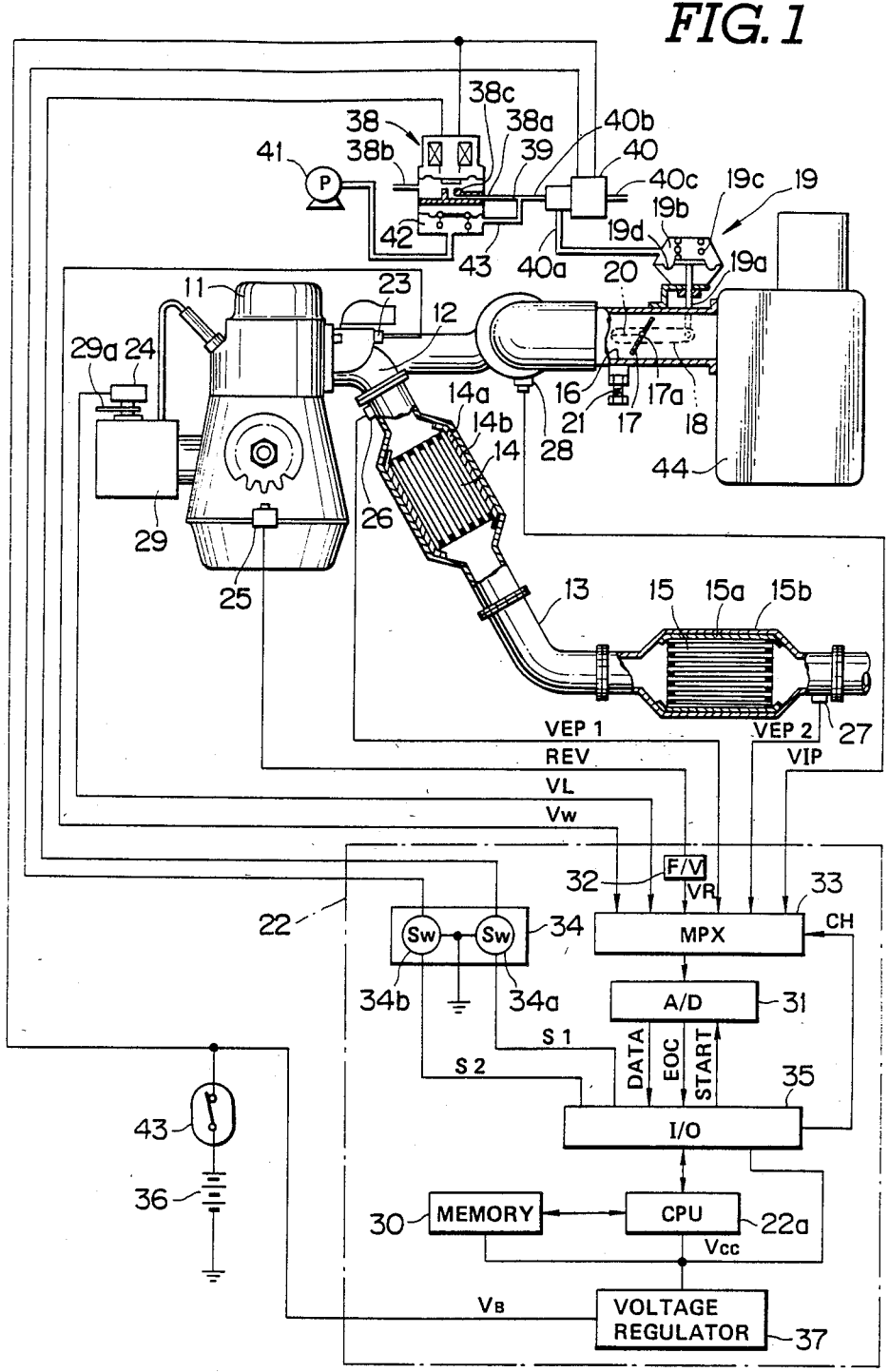
FIG. 1 is a diagram of an exhaust particle removing system for an engine according to a first embodiment of this invention.

With reference to FIG. 1, a diesel engine 11 has an exhaust manifold 12 extending from an engine block and leading to a common pipe defining an exhaust passage 13. A first filter 14 equipped with catalyst is disposed in the exhaust passage 13 downstream of the junction of branches in the exhaust manifold 12. The first filter 14 is housed by a casing 14b. A buffer 14a is interposed between the first filter 14 and the casing 14b. A second filter 15 equipped with catalyst is disposed in the exhaust passage 13 downstream of the first filter 14. The second filter 15 is housed by a casing 15b. A buffer 15a is interposed between the second filter 15 and the casing 15b.

The exhaust particle trapping efficiency of the first filter 14 and the exhaust particle trapping efficiency of the second filter 15 are chosen so that the amount of the exhaust particles trapped by the first filter 14 will be greater than the amount of the exhaust particles trapped by the second filter 15. For example, the trapping efficiency of the first filter 14 is 35% and the trapping efficiency of the second filter 15 is 38.5%. In this case, 35% of exhaust particles emitted from the engine 11 are trapped by the first filter 14. 38.5% of the remaining exhaust particles, that is, the exhaust particles which passed through the first filter 14, are trapped by the second filter 15. In other words, approximately 25% of the exhaust particles emitted from the engine 11 are trapped by the second filter 15.

A rotatable butterfly valve 17 is disposed within an air intake passage 16 extending between an air cleaner 44 and the engine block. The valve 17 is mounted on a shaft 17a so that the valve 17 rotates together with the shaft 17a. The shaft 17a is connected to a diaphragm 19d of a pressure-responsive actuator 19 via a rod 19a and a lever 18. The valve 17 rotates as the diaphragm 19d moves. The actuator 19 includes a control chamber 19b partially defined by the diaphragm 19d, and a spring 19c urging the diaphragm 19d. The diaphragm 19d moves in accordance with the pressure in 0 the control chamber 19b so that the position of the valve 17 depends on the pressure in the control chamber 19b. An end of the lever 18 has a stopper 20 which is engageable with an adjustment screw 21 movably mounted on the walls defining the air intake passage 16. As the valve 17 rotates from a fully open position, the stopper 20 moves toward the adjustment screw 21. When the stopper 20 encounters the adjustment screw 21, the valve 17 is stopped. The adjustment screw 21 adjustably determines a minimal open position of the valve 17. As the valve 17 rotates from the fully open position toward the minimal open position, the flow of intake air is throttled. Even when the valve 17 assumes the minimal open position, the rate of the intake air flow adequate to burn fuel is allowed.

As the flow of intake air is throttled by the valve 17, the temperature of exhaust gas generally rises. It should be noted that the diesel engine 11 is always supplied with intake air at an excessive rate relative to the rate of fuel supply to the engine 11. As will be made clear hereinafter, when the filters 14 and 15 require rejuvenation treatment and the engine 11 operates under a preset range of conditions, the flow of intake air is throttled by the valve 17 to increase the temperature of exhaust gas to a level adequate to burn off the exhaust particles from the filters 14 and 15.

A sensor 23 generates an analog signal VW representing the temperature of engine coolant.

A sensor 24 generates an analog signal VL representing the engine load. Specifically, the sensor 24 includes a potentiometer mechanically connected to a control lever 29a of a fuel injection pump 29. The position of the control lever 29a determines the rate of fuel injection into the engine 11. The control lever 29a is generally linked to an accelerator pedal (not shown). As the control lever 29a is rotated to vary the rate of fuel supply to the engine 11, the potentiometer is adjusted and the signal VL varies. Since the required rate of fuel injection reflects the engine load, the signal VL represents the engine load.

A sensor 25 generates a singal REV dependent on the engine speed. Specifically, the sensor 25 includes a crank angle sensor associated with the crankshaft of the engine 11. The crank angle sensor generates pulses REV at a frequency proportional to the rotational speed of the crankshaft, that is, to the engine speed.

A sensor 26 generates an analog signal VEP1 representing the pressure in the exhaust passage 13 at a point upstream of the first filter 14. The sensor 26 may be of a semiconductor-type.

A sensor 27 generates an analog signal VEP2 representing the pressure in the exhaust passage 13 at a point downstream of the second filter 15. The sensor 27 may be of a semiconductor-type.

A sensor 28 generates an analog signal VIP representing the pressure in the air intake passage 16 at a point downstream of the throttle valve 17. The sensor 27 may be of a semiconductor-type.

A control unit 22 includes a frequency-to-voltage (F/V) converter 32 deriving an analog signal VR from the engine revolution signal REV. The voltage of the signal VR is proportional to the frequency of the crank angle pulses REV, that is, to the engine speed.

The control unit 22 also includes the combination of a central processing unit (CPU) 22a, a memory section 30, and a peripheral input/output (I/O) circuit 35. The CPU 22a includes an internal random-access memory (RAM). The memory section 30 has a read-only memory (ROM) and a random-access memory (RAM) The control unit 22 further includes an analog-to-digital (A/D) converter 31 and a multiplexer (MPX) 33.

The multiplexer 33 receives the engine temperature signal VW, the engine load signal VL, the engine speed signal VR, the upstream exhaust pressure signal VEP1, the downstream exhaust pressure signal VEP2, and the intake pressure signal VIP. The multiplexer 33 selects one of these signals and passes it to the A/D converter 31 in compliance with a channel selection signal CH issued from the I/O circuit 35. When the I/O circuit 35 outputs a start signal START to the A/D converter 31, the device 31 commences to convert the selected analog signal into a corresponding digital signal DATA. This digital signal DATA is inputted into the I/O circuit 35 when the A/D converter 31 outputs an end-of-conversion signal EOC to the I/O circuit 35.

A voltage regulator 37 is electrically connected across an electrical power source 36, such as a battery, via an engine key switch 43. The voltage regulator 37 derives a constant voltage Vcc from the voltage across the power source 36. The CPU 22a, the memory section 30, the I/O circuit 35, and other electrical circuits within the control unit 22 are powered by the constant voltage Vcc.

A switching section 34 includes first and second switches 34a and 34b mainly composed of switching transistors. The first switch 34a is electrically connected across the power source 36 via the engine key switch 43 and an electromagnetic valve 38. Accordingly, in cases where the engine key switch 43 is closed, the electromagnetic valve 38 is energized and de-energized when the first switch 34a is closed and opened, respectively. The second switch 34b is electrically connected across the power source 36 via the engine key switch 43 and an electromagnetic valve 40. Accordingly, in cases where the engine key switch 43 is closed, the electromagnetic valve 40 is energized and de-energized when the second switch 34b is closed and opened, respectively.

A pump 41 generates a vacuum which is applied to the inlet of a pressure control valve 42. The pressure control valve 42 derives an adjusted vacuum from the vacuum generated by the pump 41. This adjusted vacuum is developed in the outlet of the pressure control valve 42 leading to a vacuum passage 43.

The electromagnetic valve 38 includes a first port 38a, a second port 38b, and a movable valve member which blocks and unblocks a valve opening 38c formed in a path connecting the first and second ports 38a and 38b. When the electromagnetic valve 38 is energized and de-energized, the valve opening 38c is unblocked and blocked respectively. The first port 38a leads to a pressure control passage 39 connected directly to the vacuum passage 43. The second port 38b leads to atmosphere. When the valve opening 38c is unblocked, the atmosphere is admitted into the pressure control passage 39 so that the pressure in the passage 39 increases. When the valve opening 38c is blocked, the admission of the atmosphere into the pressure control passage 39 is interrupted so that the pressure in the passage 39 decreases toward the adjusted vacuum determined by the pressure control valve 42.

The first switch 34a has a control terminal receiving a signal S1 from the I/O circuit 35. The control signal S1 is binary, assuming either of two states, e.g., a high-level state and a low-level state. When the control signal S1 assumes the first state and the second state, the switch 34a is closed and opened so that the electromagnetic valve 38 is normally energized and de-energized, respectively. The control unit 22 adjusts the electromagnetic valve 38 via the control signal S1. The control signal S1 normally changes between the two states at a high frequency so that the electromagnetic valve 38 is periodically energized and de-energized at the same frequency. This high frequency pulse drive of the electromagnetic valve 38 allows the pressure in the control passage 39 to be maintained at a level, which is determined by the duty cycle of the control signal S1. The frequency of the drive pulses to the electromagnetic valve 38 is preferably in the range of 30–50 Hz. As will be made clear hereinafter, when the filters 14 and 15 need rejuvenation treatment and the engine 11 operates under preset conditions, the periodical pulse drive of the electromagnetic valve 38 is enabled. When the filters 14 and 15 are not subject to rejuvenation treatment, the periodical pulse drive of the electromagnetic valve 38 is disabled and, specifically, the electromagnetic valve 38 remains de-energized for the saving of energy.

The electromagnetic valve 40 includes a first port 40a, a second port 40b, and a third port 40c. The first port 40a is connected to the control chamber 19b of the actuator 19. The second port 40b is connected to the pressure control passage 39. The third port 40c leads to atmosphere. When the electromagnetic valve 40 is energized, the first port 40a is connected to the second port 40b and is disconnected from the third port 40c so that the pressure in the passage 39 is applied to the control chamber 19b. In this case, the position of the throttle valve 17 is determined by the duty cycle of the control signal S1, since the control chamber 19b is exposed to the pressure dependent on the duty cycle of the control signal S1 and the position of the throttle valve 17 depends on the pressure in the control chamber 19b. Specifically, the throttle valve 17 moves toward its minimal open position as an on-duty cycle of the control signal S1 decreases. As will be made clear hereinafter, during filter rejuvenation treatment, the control unit 22 adjusts the throttle valve 17 via the control signal S1 to throttle the intake air flow under a preset range of engine operating conditions. When the electromagnetic valve 40 is de-energized, the first port 40a is connected to the third port 40c and is disconnected from the second port 40b so that the atmospheric pressure is applied to the control chamber 19b. In this case, the throttle valve 17 assumes the fully open position in which a free flow of intake air is allowed. As will be made clear hereinafter, when the filters 14 and 15 do not need rejuvenation treatment, the electromagnetic valve 40 remains de-energized to disable throttling of the intake air flow and also to save energy.

The second switch 34b has a control terminal receiving a signal S2 from the I/O circuit 35. The control signal S2 is binary, assuming either of two states, e.g., a high-level state and a low-level state. When the control signal S2 assumes the first state and the second state, the switch 34b is closed and opened so that the electromagnetic valve 40 is normally energized and de-energized, respectively. The control unit 22 adjusts the electromagnetic valve 40 via the control signal S2.

The control unit 22 operates in accordance with a program stored in the ROM within the memory section 30. FIGS. 2(A), 2(B), 2(C), and 2(D) together are a flowchart of this program.

Figure 2A:
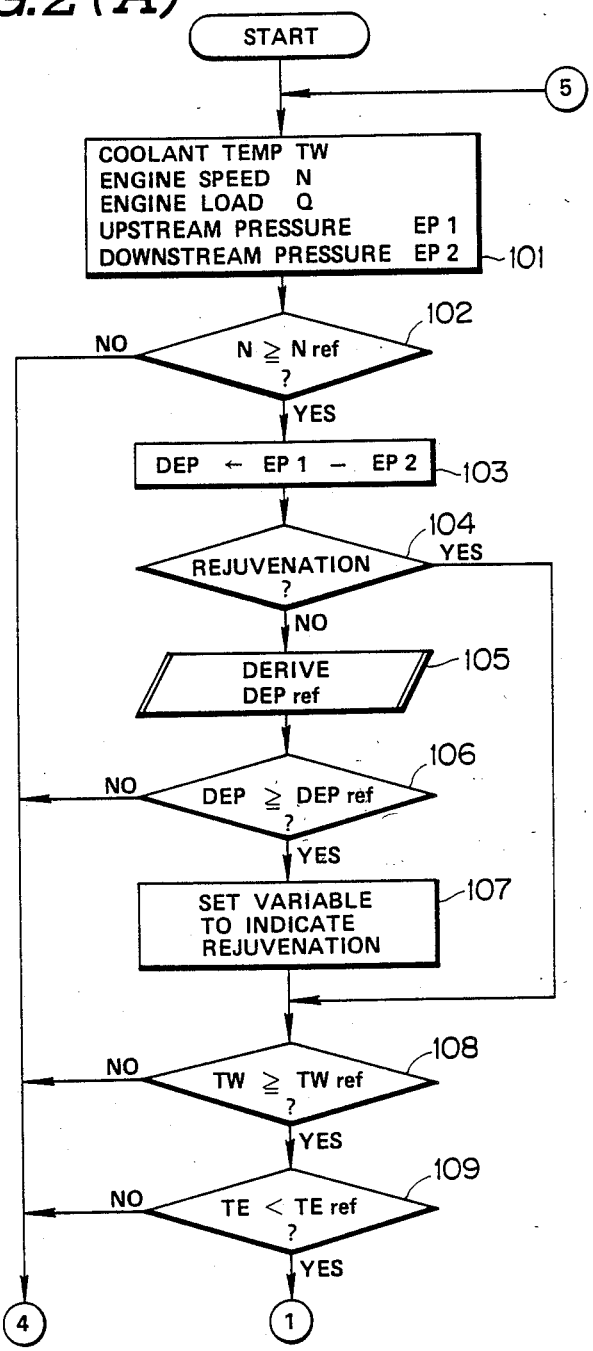
FIGS. 2(A), 2(B), 2(C), and 2(D) together are a flowchart of a program for operating the control unit of FIG. 1.
Figure 2B:
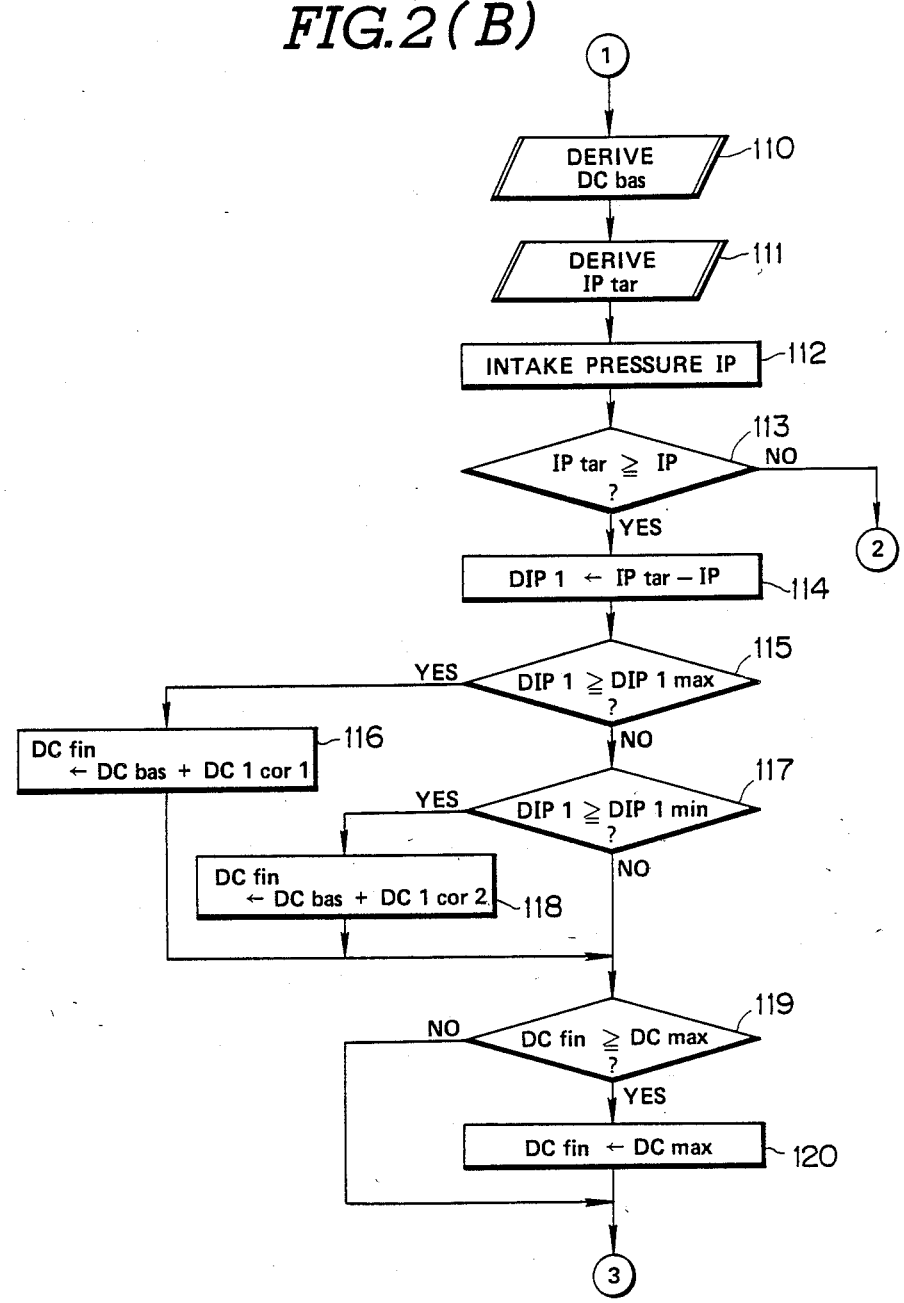
Figure 2C:
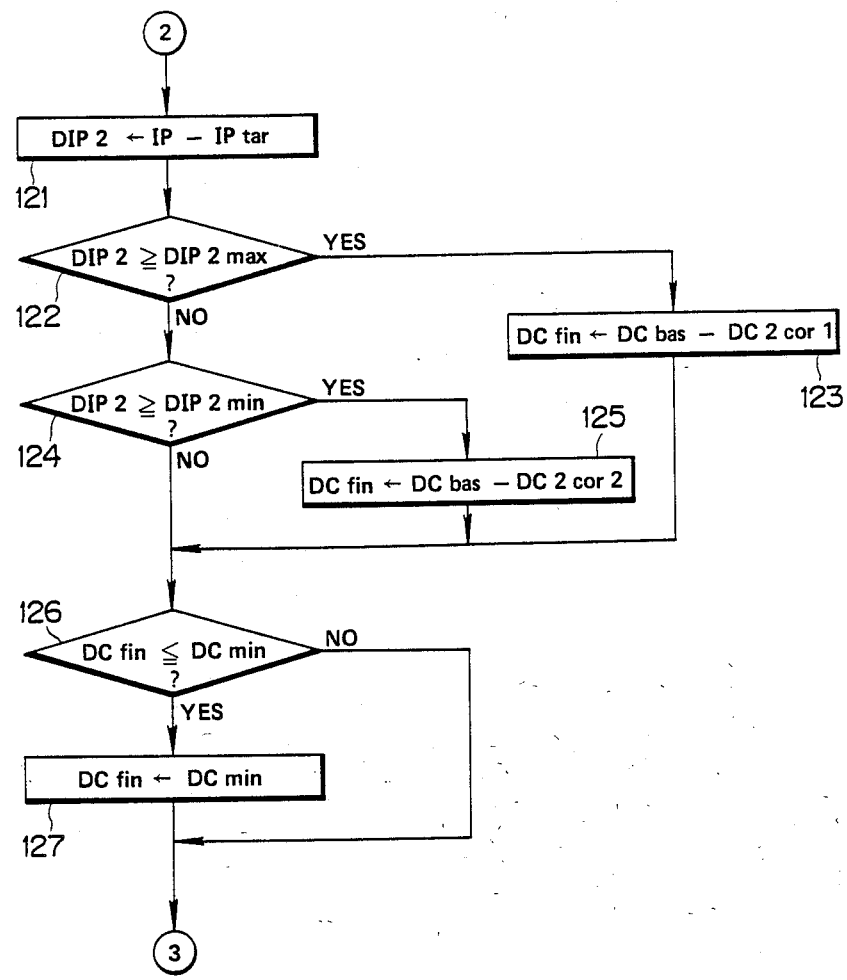
Figure 2D:
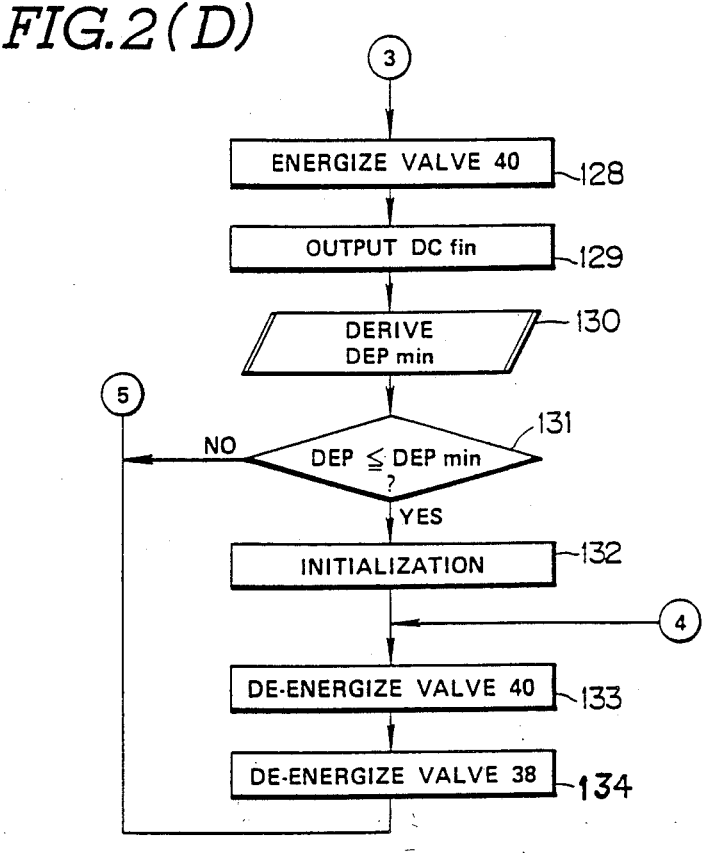

As shown in FIG. 2(A), a first step 101 of the program derives the current engine coolant temperature TW, the current engine speed N, the current engine load Q, the current upstream exhaust pressure EP1, and the current downstream exhaust pressure EP2 from the signals VW, VR, VL, VEP1, and VEP2 respectively.

A step 102 following the step 101 compares the current engine speed N to a reference speed Nref, e.g., 500 rpm, to determine whether or not the engine 11 has started. If the engine speed N is equal to or greater than the reference speed Nref, that is, if the engine 11 has already started, the program advances to a step 103. If the engine speed N is lower than the reference speed Nref, that is, if the engine 11 has not yet started, the program advances to a step 133 (see FIG. 2(D)).

The step 133 orders the control signal S2 to de-energize the electromagnetic valve 40. This allows the atmosphere to be admitted into the control chamber 19b of the actuator 19, forcing the throttle valve 17 to its fully open position at which a free flow of intake air is allowed.

A step 134 following the step 133 orders the control signal S1 to de-energize the electromagnetic valve 38. This is to save energy. After the step 134, the program returns to the step 101.

The step 103 calculates the difference DEP between the current upstream exhaust pressure EP1 and the current downstream exhaust pressure EP2. Specifically, "DEP=EP1−EP2" is executed. The pressure differential DEP represents the pressure across the series combination of the filters 14 and 15. Since the pressure across the series combination of the filters 14 and 15 increases with the degree of clogging of the filters 14 and 15, the pressure differential DEP represents the degree of clogging of the series combination of the filters 14 and 15.

A step 104 following the step 103 checks whether or not filter rejuvenation treatment is being performed by referring to the value of a rejuvenation-representing variable held by the internal RAM within the CPU 22a. If the filter rejuvenation treatment is not being performed, the program advances to a step 105. Immediately after the engine start, the program always proceeds from the step 104 to the step 105. If the filter rejuvenation treatment is being performed, the program jumps to a step 108.

The step 105 derives a reference pressure differential DEPref from the current engine speed N and the current engine load Q. Specifically, the ROM within the memory section 30 holds a table in which a set of reference pressure differential values are plotted as a function of engine speed and engine load. The reference pressure differential DEPref is derived by referring to this table. The reference pressure differentials are chosen to correspond to the boundary between an acceptable range and an unacceptable range of the pressure differential DEP. In the acceptable range, the degree of clogging of the series combination of the filters 14 and 15 is approvable so that the filters 14 and 15 do not need rejuvenation treatment. In the unacceptable range, the degree of clogging of the series combination of the filters 14 and 15 is unapprovable so that the filters 14 and 15 need rejuvenation treatment.

A step 106 following the step 105 compares the pressure differential DEP to the reference pressure differential DEPref. If the pressure differential DEP is equal to or greater than the reference pressure differential DEPref, that is, if the degree of clogging of the series combination of the filters 14 and 15 is unacceptable, the program advances to a step 107. If the pressure differential DEP is smaller than the reference pressure differential DEPref, that is, if the degree of clogging of the series combination of filters 14 and 15 is acceptable, the program advances to the step 133 which allows a free flow of intake air as described previously. After the step 133, the program returns to the step 101 by way of step 134 which de-energizes the electromagnetic valve 38 as described previously.

The step 107 sets or adjusts the value of the rejuvenation-representing variable to indicate that the filter rejuvenation treatment is being performed. After the step 107, the program advances to the step 108.

The step 108 compares the current engine coolant temperature TW to a reference temperature TWref, e.g., 60° C., to determine whether or not the engine 11 has adequately warmed up. If the coolant temperature TW is equal to or higher than the reference temperature TWref, that is, if the engine 11 has already warmed up, the program advances to a step 109. If the coolant temperature TW is lower than the reference temperature TWref, that is, if the engine 11 has not yet warmed up, the program advances to the step 133 which allows a free flow of intake air as described previously. After the step 133, the program returns to the step 101 by way of the step 134 which de-energizes the electromagnetic valve 38 as described previously.

The step 109 deduces the current temperature TE of engine exhaust from the current engine speed N and the current engine load Q. Specifically, the ROM within the memory section 30 holds a table in which a set of exhaust temperature values are plotted as a function of engine speed and engine load. The exhaust temperature TE is deduced by referring to this table. Then, the step 109 compares the exhaust temperature TE to a reference temperature TEref chosen to correspond to the lower limit of a range of exhaust temperatures in which the catalyst on the filters 14 and 15 is adequately active. For example, the reference temperature TEref is 400° C. If the exhaust temperature TE is lower than the reference temperature TEref, that is, if throttling of the intake air flow to increase the actual exhaust temperature is necessary to perform filter rejuvenation treatment, the program advances to a step 110 (see FIG. 2(B)). If the exhaust temperature TE is equal to or higher than the reference temperature TEref, that is, if filter rejuvenation treatment is already being performed even without throttling of the intake air flow, the program advances to the step 133 which allows a free flow of intake air as described previously. After the step 133, the program returns to the step 101 by way of the step 134 which de-energizes the electromagnetic valve 38 as described previously.

The step 110 derives a basic desired on-duty cycle DCbas of the control signal S1 from the current engine speed N and the current engine load Q. Specifically, the ROM within the memory section 30 holds a table in which basic desired on-duty cycles of the control signal S1 are plotted as a function of engine speed and engine load. The basic desired on-duty cycle DCbas is derived by referring to this table.

Figure 3:
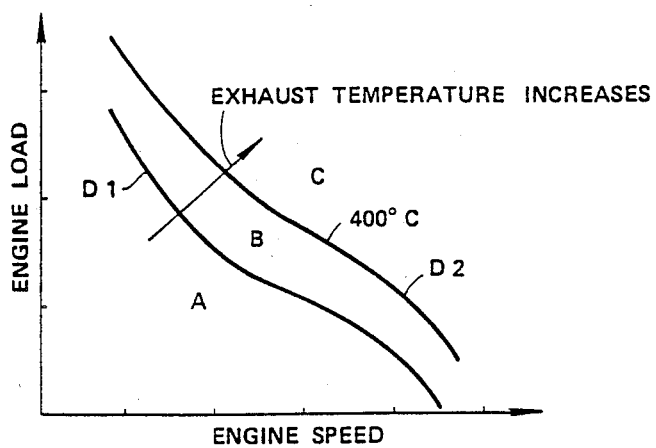
FIG. 3 is a diagram of ranges of engine speed and engine load in which different controls for filter rejuvenation treatment are performed.

As shown in FIG. 3, engine speed and engine load are divided into three ranges A, B, and C. In the engine condition range A below a boundary D1, the basic desired on-duty cycles DCbas are chosen to maintain the intake air pressure at essentially a constant level. In the engine condition range B between the boundary D1 and a higher boundary D2 corresponding to the reference exhaust temperature TEref, e.g., 400° C., the basic desired on-duty cycles DCbas are chosen to adjust the intake air pressure with the engine speed and the engine load in order to increase the actual exhaust temperature to the reference exhaust temperature TEref.

A step 111 following the step 110 derives a target intake air pressure IPtar from the current engine speed N and the current engine load Q. Specifically, the ROM within the memory section 30 holds a table in which a set of target intake air pressure values are plotted as a function of engine speed and engine load. The target intake air pressure IPtar is derived by referring to this table.

In the engine condition range B of FIG. 3, the target intake air pressures IPtar are chosen to drop with decreases in either of the engine speed and the engine load. In other words, in this range B, the target intake vacuums strengthen as either of the engine speed and the engine load decreases. As a result, in the engine condition range B, the degree of throttling of the intake air flow is increased with decreases in either of the engine speed and the engine load. In the engine condition range A of FIG. 3, the target intake air pressures IPtar are chosen to remain at a fixed value independent of the engine speed and the engine load. This fixed value corresponds to the smallest of target intake air pressures in the engine condition range B.

A step 112 following the step 111 derives the current intake air pressure IP from the signal VIP.

A step 113 following the step 112 compares the target intake air pressure IPtar to the actual intake air pressure IP. If the target intake air pressure IPtar is equal to or higher than the actual intake air pressure IP, that is, if the intake air flow is throttled at a degree equal to or greater than a target degree, the program advances to a step 114. If the target intake air pressure IPtar is lower than the actual intake air pressure IP, that is, if the intake air flow is throttled at a degree less than a target degree, the program advances to a step 121 (see FIG. 2(C)).

The step 114 calculates the difference DIP1 between the target intake air pressure IPtar and the actual intake air pressure IP. Specifically, "DIP1=IPtar−IP" is executed.

A step 115 following the step 114 compares the difference DIP1 to a reference value DIP1max corresponding to a pressure differential, e.g., 50 mmHg. If the difference DIP1 is equal to or greater than the reference value DIP1max, the program advances to a step 116. If the difference DIP1 is smaller than the reference value DIP1max, the program advances to a step 117.

The step 116 calculates a final desired on-duty cycle DCfin of the control signal S1 from the basic desired on-duty cycle DCbas and a preset positive corrective value DC1cor1. Specifically, "DCfin=DCbas+DC1cor1" is executed. Since increases in the on-duty cycle of the control signal S1 move the throttle valve 17 toward its fully open position, this corrective step 116 generally moves the throttle valve 17 toward its fully open position. For example, the corrective value DC1cor1 corresponds to an on-duty cycle of 20%. After the step 116, the program advances to a step 119.

The step 117 compares the difference DIP1 to a reference value DIP1min smaller than the reference value DIP1max. For example, the reference value DIP1min corresponds to 20 mmHg. If the difference DIP1 is equal to or greater than the reference value DIP1min, the program advances to a step 118. If the difference DIP1 is smaller than the reference value DIP1min, the program advances to the step 119.

The step 118 calculates a final desired on-duty cycle DCfin of the control signal S1 from the basic desired on-duty cycle DCbas and a preset positive corrective value DC1cor2. Specifically, "DCfin=DCbas+DC1cor2" is executed. Since increases in the on-duty cycle of the control signal S1 move the throttle valve 17 toward its fully open position, this corrective step 118 generally moves the throttle valve 17 toward its fully open position. The corrective value DC1cor2 is smaller than the corrective value DC1cor1. For example, the corrective value DC1cor2 corresponds to an on-duty cycle of 10%. After the step 118, the program advances to the step 119.

When the intake air flow is throttled at a degree equal to or greater than a target degree, the step 113 usually allows the program to advance to one of the steps 116 and 118 which move the throttle valve 17 toward its fully open position. This movement of the throttle valve 17 reduces the degree of throttling of the intake air flow. Accordingly, in this case, the degree of throttling of the intake air flow is adjusted toward the target degree.

The step 119 compares the final desired on-duty cycle DCfin to a reference on-duty cycle DCmax, e.g., 90%. If the final desired on-duty cycle DCfin is equal to or greater than the reference on-duty cycle DCmax, the program advances to a step 120. If the final desired on-duty cycle DCfin is smaller than the reference on-duty cycle DCmax, the program jumps to a step 128 (see FIG. 2(D)).

The step 120 sets the final desired on-duty cycle DCfin to the reference on-duty cycle DCmax. Specifically, "DCfin DCmax" is executed. After the step 120, the program advances to the step 128 (see FIG. 2(D)).

The steps 119 and 120 limit the final desired on-duty cycle DCfin to or below the reference on-duty cycle DCmax. The reference on-duty cycle DCmax is chosen to expose the control chamber 19b of the actuator 19 to a vacuum which exerts a force on the diaphragm 19d slightly stronger than the initial setting load by the spring 19c, that is, the force on the diaphragm 19d exerted by the spring 19c when the control chamber 19b is exposed to the atmospheric pressure. This choice of the reference on-duty cycle DCmax allows the throttle valve 17 to quickly respond to a variation in the pressure in the control chamber 19b of the actuator 19.

The step 121 calculates the difference DIP2 between the target intake air pressure IPtar and the actual intake air pressure IP. Specifically, "DIP2=IP−IPtar" is executed.

A step 122 following the step 121 compares the difference DIP2 to a reference value DIP2max corresponding to a pressure differential, e.g., 50 mmHg. If the difference DIP2 is equal to or greater than the reference value DIP2max, the program advances to a step 123. If the difference DIP2 is smaller than the reference value DIP2max, the program advances to a step 124.

The step 123 calculates a final desired on-duty cycle DCfin of the control signal S1 from the basic desired on-duty cycle DCbas and a preset positive corrective value DC2cor1. Specifically, "DCfin=DCbas−DC2cor1" is executed. Since decreases in the on-duty cycle of the control signal S1 move the throttle valve 17 toward its minimal open position, this corrective step 123 generally moves the throttle valve 17 toward its minimal open position. For example, the corrective value DC2cor1 corresponds to an on-duty cycle of 20%. After the step 123, the program advances to a step 126.

The step 124 compares the difference DIP2 to a reference value DIP2min smaller than the reference value DIP2max. For example, the reference value DIP2min corresponds to 20 mmHg. If the difference IP2 is equal to or greater than the reference value DIP2min, the program advances to a step 125. If the difference DIP2 is smaller than the reference value DIP2min, the program advances to the step 126.

The step 125 calculates a final desired on-duty cycle DCfin of the control signal S1 from the basic desired on-duty cycle DCbas and a preset positive corrective value DC2cor2. Specifically, "DCfin=DCbas−DC2cor2" is executed. Since decreases in the on-duty cycle of the control signal S1 move the throttle valve 17 toward its minimal open position, this corrective step 125 generally moves the throttle valve 17 toward its minimal open position. The corrective value DC2cor2 is smaller than the corrective value DC2cor1. For example, the corrective value DC2cor2 corresponds to an on-duty cycle of 10%. After the step 125, the program advances to the step 126.

When the the intake air flow is throttled at a degree less than a target degree, the step 113 usually allows the program to advance to one of the steps 123 and 125 which move the throttle valve 17 toward its minimal open position. This movement of the throttle valve 17 increases the degree of throttling of the intake air flow. Accordingly, in this case, the degree of throttling of the intake air flow is adjusted toward the target degree.

The step 126 compares the final desired on-duty cycle DCfin to a reference on-duty cycle DCmin, e.g., 10%. If the final desired on-duty cycle DCfin is equal to or smaller than the reference on-duty cycle DCmin, the program advances to a step 127. If the final desired on-duty cycle DCfin is greater than the reference on-duty cycle DCmin, the program jumps to the step 128 (see FIG. 2(D)).

The step 127 sets the final desired on-duty cycle DCfin to the reference on-duty cycle DCmin. Specifically, "DCfin=DCmin" is executed. After the step 127, the program advances to the step 128 (see FIG. 2(D)).

The steps 126 and 127 limit the final desired on-duty cycle DCfin to or above the reference on-duty cycle DCmin. The reference on-duty cycle DCmin is chosen to expose the control chamber 19b of the actuator 19 to a vacuum which exerts a force on the diaphragm 19d slightly weaker than the maximal load by the spring 19c, that is, the force on the diaphragm 19d exerted by the spring 19c when the actuator 19 is maximally lifted. This choice of the reference on-duty cycle DCmin allows the throttle valve 17 to quickly respond to a variation in the pressure in the control chamber 19b of the actuator 19.

The step 128 orders the control signal S2 to energize the electromagnetic valve 40. This allows the control chamber 19b of the actuator 19 to be exposed to a vacuum determined by the on-duty cycle of the pulse signal S1 controlling the electromagnetic valve 38. Accordingly, in this case, the position of the throttle valve 17 is adjusted with the on-duty cycle of the control signal S1.

A step 129 following the step 128 outputs a signal indicative of the final desired on-duty cycle DCfin of the control signal S1 to a register within the I/O circuit 35. In accordance with the signal held by this register, a pulse-width modulating device included in the I/O circuit 35 adjusts the actual on-duty cycle of the control signal S1 to be equal to the final desired on-duty cycle DCfin in a known way. As a result, the position of the throttle valve 17 is controlled in accordance with the final desired on-duty cycle DCfin of the control signal S1.

A step 130 following the step 129 derives a reference pressure DEPmin across the series combination of the filters 14 and 15 from the current engine speed N and the current engine load Q. Specifically, the ROM within the memory section 30 holds a table in which a set of reference pressure values are plotted as a function of engine speed and engine load. The reference pressure DEPmin is derived by referring to this table. The reference pressures DEPmin are chosen to correspond to conditions of the filters 14 and 15 under which the degree of clogging of the series combination of the filters 14 and 15 is essentially null, that is, under which the amount of exhaust particles deposited on the filters 14 and 15 is essentially null.

A step 131 following the step 130 compares the pressure differential DEP to the reference pressure differential DEPmin. If the pressure differential DEP is equal to or lower than the reference pressure differential DEPmin, that is, if the degree of clogging of the filters 14 and 15 is essentially null, the program advances to a step 132. If the pressure differential DEP is higher than the reference pressure differential DEPmin, that is, if the degree of clogging of the filters 14 and 15 is not essentially null, the program returns to the step 101. This return allows the filter rejuvenation treatment to continue until the degree of clogging of the filters 14 and 15 decreases to a null level.

The step 132 initializes the rejuvenation-representing variable to a value indicating that filter rejuvenation treatment is not being performed. After the step 132, the program advances to the step 133 which allows a free flow of intake air as described previously. Accordingly, in this case, throttling of the intake air flow is suspended. After the step 133, the program returns to the step 101 by way of the step 134 which de-energizes the electromagnetic valve 38 as described previously.

In the engine condition range B of FIG. 3, if the intake air flow is not throttled, the exhaust temperature would be equal to or less than a specific value at which the catalyst on the filters 14 and 15 is active. According to the embodiment of this invention, in cases where the filters 14 and 15 require rejuvenation treatment, since the intake air flow is throttled to maintain the exhaust temperature at the specific value, the exhaust particles deposited on the filters 14 and 15 are effectively burned off and removed. In addition, since the degree of throttling of the intake air flow is increased at appropriate rates as either of the engine speed and the engine load decreases, an excessive degree of throttling of the intake air flow is prevented.

In the engine condition range A of FIG. 3, during the filter rejuvenation treatment, since the intake air flow is throttled in such a manner as to maintain the intake air pressure at essentially a fixed level, an excessive decrease in the engine power output is prevented.

In the engine condition range C of FIG. 3, the intake air flow is not throttled even when the filters 14 and 15 need rejuvenation treatment. In this range C, the exhaust temperature is maintained in a range where the catalyst on the filters 14 and 15 is active even if the intake air flow is not throttled. Accordingly, the exhaust particles are automatically burned off and removed without throttling of the intake air flow.

Since the upstream filter 14 is exposed to exhaust temperatures higher than exhaust temperatures to which the downstream filter 15 is exposed, the exhaust particles on the upstream filter 14 can be burned off more effectively and quickly than the exhaust particles on the downstream filter 15. This is advantageous, because the amount of exhaust particles trapped by the upstream filter 14 is greater than the amount of exhaust particles trapped by the downstream filter 15 as described previously.

It should be noted that the embodiment of this invention may include an arrangement for increasing the exhaust temperature, such as a burner, in place of the mechanism for throttling the intake air flow.

DESCRIPTION OF THE SECOND PREFERRED EMBODIMENT

FIG. 4 shows a second embodiment of this invention, which is similar to the embodiment of FIGS. 1-3 except for the design changes indicated hereinafter.

As shown in FIG. 4, a four-cylinder diesel engine 11 is equipped with an exhaust manifold 12 having four branches 12a, 12b, 12c, and 12d. Catalyst-equipped filters 50a, 50b, 50c, and 50d are disposed within the manifold branches 12a, 12b, 12c, and 12d respectively. Casings 52a, 52b, 52c, and 52d house the filters 50a, 50b, 50c, and 50d respectively. Buffers 51a, 51b, 51c, and 51d are interposed between the casing 52a and the filter 50a, between the casing 52b and the filter 50b, between the casing 52c and the filter 50c, and between the casing 52d and the filter 50d, respectively.

The manifold branches 12a, 12b, 12c, and 12d have openings 53a, 53b, 53c, and 53d at points upstream of the filters 50a, 50b, 50c, and 50d respectively. A pipe arrangement defines a communication passage 54 connecting the interiors of the manifold branches 12a-12d via the openings 53a-53d.

If one of the filters 50a-50d clogs at a degree higher than degrees of clogging of other filters, the communication passage 54 allows more of engine exhaust to flow through the less-clogged filters so that the latter filters trap more amounts of exhaust particles. As a result, the degrees of clogging of the filters 50a-50d are equalized.

Catalyst-equipped filters 14 and 15 are disposed within an exhaust passage 13 downstream of the junction of the manifold branches 12a-12d as in the embodiment of FIGS. 1-3.

The filters 50a-50d are similar to each other. The filters 50a-50d, 14, and 15 are designed so that the amount of exhaust particles trapped by the filters 50a-50d is greater than the amount of exhaust particles trapped by the filter 14 and that the amount of exhaust particles trapped by the filter 14 is greater than the amount of exhaust particles trapped by the filter 15. Specifically, the trapping efficiency of the filters 50a-50d, the trapping efficiency of the filter 14, and the trapping efficiency of the filter 15 are 22.5%, 25.8%, and 30.4% respectively.

An upstream exhaust pressure sensor 26 is located at a point of the exhaust passage upstream of the filters 50a-50d. The communication passage 54 enables the sensor 26 to be responsive to an average of the degrees of clogging of the filters 50a-50d.

What is claimed is:

1. An exhaust particle removing system for an engine comprising:
    (a) first and second filter means disposed separately in an exhaust passage of the engine and connected in series with one another, the first filter residing at a location upstream of the second filter, the first filter being operative to trap an amount of exhaust particles greater than an amount of exhaust particles trapped by the second filter;
    (b) means for sensing a pressure across the series combination of the first and second filter means; and (c) means for rejuvenating the first and second filter means, when the sensed pressure reaches a reference pressure, (d) said first filter comprising sub-filters respectively disposed in branches of an exhaust manifold of the engine.

2. The system of claim 1, further comprising connecting means providing a passageway connecting the branches of the exhaust manifold at locations upstream of said sub-filters.

3. The system of claim 2, wherein said second filter means has a trapping efficiency which is greater than a trapping efficiency of said first filter means.

4. The system of claim 1 for use with an internal combustion engine having an intake passage means for supplying air to the engine and an exhaust system including said exhaust passage for discharging exhaust gases from the engine to the atmosphere wherein said first filter means traps exhaust particles discharged from the engine and said second filter means traps exhaust particles discharged from the first filter means.

5. The exhaust particle removing system as claimed in claim 1, wherein the exhaust passage further comprises an exhaust manifold, an exhaust passage and an exhaust pipe, and wherein said first filter means has an upstream end connected to the exhaust manifold and a downstream end connected to the exhaust passage, and wherein said second filter means has an upstream end connected to the exhaust passage and a downstream end connected to the exhaust pipe.

6. The exhaust particle removing system as claimed in claim 5 wherein said pressure sensing means is sensitive to a pressure differential between the upstream end of the first filter means and the downstream end of the second filter means for providing a sensed pressure differential, temperature sensing means sensitive to the temperature of the exhaust gas discharged from the engine for providing a sensed exhaust gas temperature, and condition responsive means for throttling the air flow to the engine to increase the exhaust gas temperature when the sensed pressure differential exceeds a predetermined value and when the sensed exhaust gas temperature is less than a predetermined value.

7. The exhaust particle removing system as claimed in claim 5, wherein said exhaust manifold has a plurality of branches, each of said branches having a third catalytic filter means for trapping exhaust particles discharged through the corresponding branch.

8. The exhaust particle removing system as claimed in claim 7, wherein each of said third filter means comprises a catalyst for burning the exhaust particles trapped in said third filter means.

9. The exhaust particle removing system as claimed in claim 1, wherein said first filter means comprises a catalyst for burning the exhaust particles trapped therein and wherein said second filter means comprises a catalyst for burning the exhaust particles trapped therein.

* * * * *